United States Patent
Kawata

(10) Patent No.: US 12,090,702 B2
(45) Date of Patent: Sep. 17, 2024

(54) ROTARY MOLDING MACHINE

(71) Applicant: KYORAKU CO., LTD., Kyoto (JP)

(72) Inventor: Katsuyuki Kawata, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 332 days.

(21) Appl. No.: 17/425,834

(22) PCT Filed: Jan. 28, 2020

(86) PCT No.: PCT/JP2020/002897
§ 371 (c)(1),
(2) Date: Jul. 26, 2021

(87) PCT Pub. No.: WO2020/158703
PCT Pub. Date: Aug. 6, 2020

(65) Prior Publication Data
US 2022/0168944 A1 Jun. 2, 2022

(30) Foreign Application Priority Data

Jan. 31, 2019 (JP) .................. 2019-015186
Aug. 30, 2019 (JP) .................. 2019-158012

(51) Int. Cl.
*B29C 49/36* (2006.01)
*B29C 49/04* (2006.01)
(Continued)

(52) U.S. Cl.
CPC .............. *B29C 49/36* (2013.01); *B29C 49/04* (2013.01); *B29C 49/5602* (2022.05); *B29C 49/70* (2013.01)

(58) Field of Classification Search
CPC ...... B29C 49/36; B29C 49/56; B29C 49/5602
See application file for complete search history.

(56) References Cited

U.S. PATENT DOCUMENTS 3,025,561 A * 3/1962 Ruekberg et al. ...... B29C 49/70
425/444
3,685,938 A * 8/1972 Lagoutte ................. B29C 49/36
425/185
(Continued)

FOREIGN PATENT DOCUMENTS

CN 101247937 A 8/2008
GB 2205062 A * 11/1988 ............. B29C 49/36
(Continued)

OTHER PUBLICATIONS

International Search Report issued on Apr. 21, 2020 in corresponding International Application No. PCT/JP2020/002897; 7 pages.
(Continued)

*Primary Examiner* — Emmanuel S Luk
*Assistant Examiner* — Elisa H Vera
(74) *Attorney, Agent, or Firm* — Maier & Maier, PLLC

(57) ABSTRACT

An object of the present invention is to provide a rotary molding machine that can be easily manufactured.
The present invention provides a rotary molding machine comprising: first and second molds; a camshaft; and a cam track member, wherein the first and second molds and the camshaft are configured to rotate around a revolving axis, the cam track member has a cam track, the camshaft is configured to move along the cam track as the first and second molds and the camshaft rotates, the first and second molds are configured to open and close as the camshaft moves, and an angle between a first axial direction and a second axial direction is 45 degrees or less, the first axial direction is a longitudinal direction of the camshaft when the first and second molds are closed, the second axial direction is the longitudinal direction of the camshaft when the first and second molds are most opened.

14 Claims, 16 Drawing Sheets

(51) Int. Cl.
*B29C 49/56* (2006.01)
*B29C 49/70* (2006.01)

(56) References Cited

U.S. PATENT DOCUMENTS

| | | | |
|---|---|---|---|
| 4,197,071 A | 4/1980 | Salle et al. | |
| 4,214,860 A * | 7/1980 | Kleimenhagen | B29C 65/00 425/149 |
| 5,049,061 A | 9/1991 | Billoud et al. | |
| 9,050,749 B1 * | 6/2015 | Yang | B29C 49/4236 |
| 2003/0138517 A1 | 7/2003 | Albrecht | |
| 2008/0143022 A1 * | 6/2008 | Legallais | B29C 49/56 425/522 |
| 2008/0220115 A1 | 9/2008 | Galloni | |
| 2010/0187730 A1 | 7/2010 | Hintermeier | |
| 2010/0203185 A1 * | 8/2010 | Litzenberg | B29C 49/56 425/522 |
| 2011/0180974 A1 | 7/2011 | Hausladen et al. | |
| 2012/0261865 A1 | 10/2012 | Neubauer et al. | |
| 2016/0001487 A1 * | 1/2016 | Yang | B29C 49/56 425/540 |

FOREIGN PATENT DOCUMENTS

| | | |
|---|---|---|
| JP | S61-47619 U | 3/1986 |
| JP | H03-96318 A | 4/1991 |
| JP | H11-333915 A | 12/1999 |
| JP | 2012-218446 A | 11/2012 |
| JP | 2016187937 A | 11/2016 |
| JP | 2017-177592 A | 10/2017 |
| KR | 20110007982 U | 8/2011 |
| WO | 9006223 A1 | 6/1990 |

OTHER PUBLICATIONS

Office Action issued on Nov. 7, 2022 in corresponding Chinese Application No. 202080007529.X; 16 pages.
Office Action issued on Jan. 24, 2023 in corresponding Japanese Application No. 2019-158012; 6 pages.
Office Action issued on Jun. 28, 2022, in corresponding Japanese Patent Application No. 2019-015186; 8 pages Including English-language translation.
Office Action issued on Dec. 8, 2023, in corresponding Korean Application No. 10-2021-7027204, 10 pages.
Office Action issued on Aug. 4, 2023, in corresponding Taiwanese Application No. 109102718, 13 pages.

\* cited by examiner

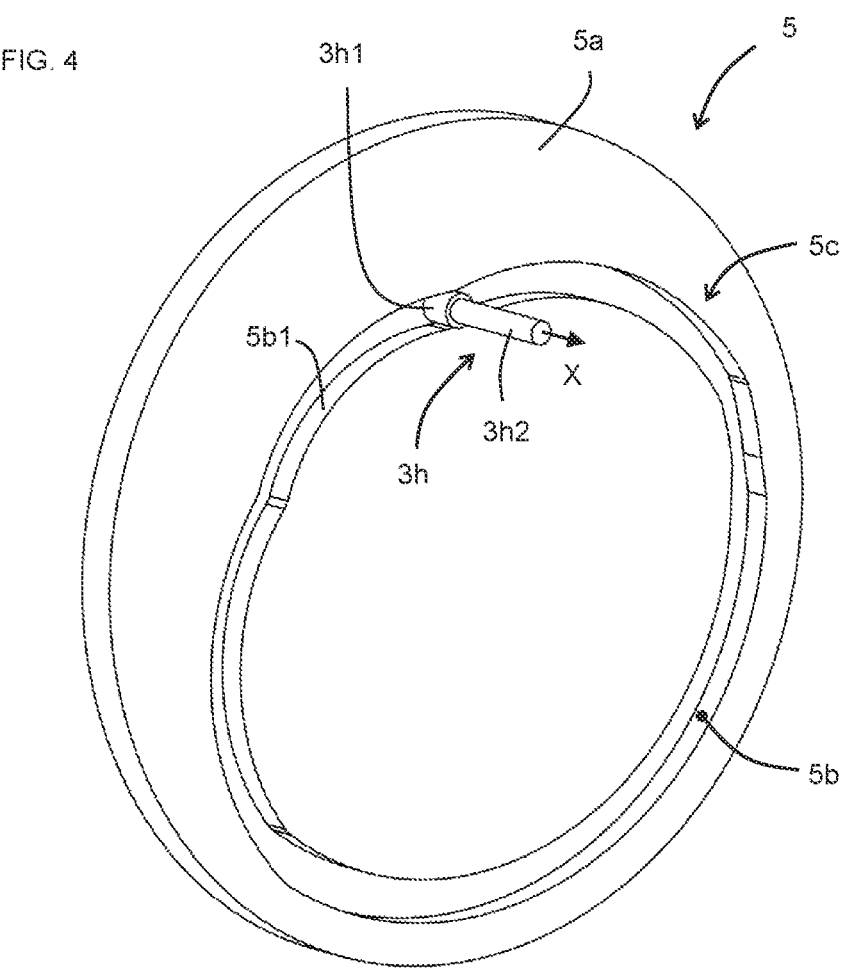

ROTARY MOLDING MACHINE

TECHNICAL FIELD

The present invention relates to a rotary molding machine.

BACKGROUND ART

In the rotary molding machine described in patent literature 1 and 2, the pair of molds are opened and closed while revolving to feed the parison between the pair of molds, mold the parison, and eject the molded article.
First Viewpoint The opening and closing of the pair of molds described in patent literature 1 are performed by moving the cam roller, which is held by a connecting rod that is integrated with one of the pair of molds, by the cam track.
Second Viewpoint The rotary molding machine described in patent literature 2 is provided with the push-up member and a guide member. The push-up member has the function of ejecting the molded article from the molds by axial rotation, and is attached to the molds in a rotatable manner. The guide member has the function of rotating the push-up member, and is attached to the rotary molding machine. Then, the push-up member contacts the guide member in the process of the molds revolving. As a result, the push-up member is rotated by the guide member and the molded article is pushed up from the molds.

CITATION LIST

Patent Literature

[Patent Literature 1] Japanese Unexamined Patent Application No. 1999-333915
[Patent Literature 2] Japanese Unexamined Utility Model Application Publication No. 1986-047619

SUMMARY OF INVENTION

Technical Problem

First Viewpoint

In patent literature 1, the angle between the direction of the connecting rod when the pair of molds are closed and the direction of the connecting rod when the pair of molds is most opened is greater than 90 degrees. Therefore, the cam track needs to be displaced in a very large three-dimensional manner, and the manufacturing of the rails to realize such a cam track is very difficult.

An object of the present invention is to provide a rotary molding machine that can be easily manufactured.
Second Viewpoint In patent literature 2, when the push-up member is in contact with the guide member, the push-up member gradually rotates along the surface of the guide member. On the other hand, when the push-up member passes through the guide member and the push-up member and the guide member are not in contact, the push-up member can rotate freely. Therefore, in the rotary molding machine described in patent literature 2, the push-up member wanders during the preliminary stage of molding the molded article, causing the push-up member to move the parison on the molds and the position of the parison to deviate from the desired position, as a result, the molded article may not be molded into the desired shape.

An object of the present invention is to provide a rotary molding machine that can mold a molded article having a desired shape more reliably.

Solution to Problem

First Viewpoint

The present invention provides a rotary molding machine comprising: first and second molds; a camshaft; and a cam track member, wherein the first and second molds and the camshaft are configured to rotate around a revolving axis, the cam track member has a cam track, the camshaft is configured to move along the cam track as the first and second molds and the camshaft rotates, the first and second molds are configured to open and close as the camshaft moves, and an angle between a first axial direction and a second axial direction is 45 degrees or less, the first axial direction is a longitudinal direction of the camshaft when the first and second molds are closed, the second axial direction is the longitudinal direction of the camshaft when the first and second molds are most opened.

In the present invention, the angle between the first axial direction and the second axial direction is 45 degrees or less, the first axial direction is the longitudinal direction of the camshaft when the first and second molds are closed, the second axial direction is the longitudinal direction of the camshaft when the first and second molds are most opened. Therefore, compared to patent literature 1, the three-dimensional displacement of the cam track is smaller, and it is easier to realize such a cam track. Thus, the present invention provides a rotary molding machine that can be easily manufactured.

Various embodiments of the present invention are described below. Any of the embodiments described below can be combined with one another.

Preferably, a distance from the revolving axis to the cam track varies along a circumferential direction.

Preferably, the cam track member has a base plate, the cam track is formed of an annular groove or an annular projection provided on the base plate.

Preferably, the first and second molds are connected by the hinge part and are configured to open and close by relative rotation around the hinge part.

Preferably, the first and second molds are configured to open and close by transmitting movement of the camshaft to the first and second molds through a gear mechanism.

Preferably, the gear mechanism has a mechanism that converts linear movement into rotational movement.

Preferably, an angle between the revolving axis and a horizontal plane is 45 degrees or less.
Second Viewpoint The present invention provides a rotary molding machine comprising: first and second molds; a push-up member; and a driving mechanism, wherein the second mold is configured to open and close with respect to the first mold, the push-up member is provided in the first mold and has a push-up part, the push-up part is configured to move from a first position to a second position and is configured to push up a molded article on the first mold by moving from the first position to the second position, the second position is farther away from the first mold than the first position, the driving mechanism has an engaging member and a driving part, the engaging member is engaged with the push-up member when the push-up part is at the first and second positions, the driving part is configured to drive the engaging member to move the push-up part from the first position to the second position.

In the present invention, since the engaging member is engaged with the push-up member when the push-up part is at both the first and second positions, the push-up member can be prevented from wandering at both the first and second positions. That is, the present invention suppresses the wandering of the push-up member in the preliminary stage of molding of a molded article, and makes it possible to mold the molded article having a desired shape more reliably.

Various embodiments of the present invention are described below. Any of the embodiments described below can be combined with one another.

Preferably, the push-up member has a contact part and a shaft support part, the push-up part is provided in one side of the push-up member, the contact part is provided in another side of the push-up member, the shaft support part is provided between the push-up part and the contact part and is axially supported by the first mold, the driving part is configured to move the engaging member in a linear direction.

Preferably, the driving part has an air cylinder and a piston, the piston is attached to the air cylinder and is connected to the engaging member.

Preferably, the rotary molding machine further comprises an air supply part, wherein the air supply part is configured to supply air into a parison, which is formed into the molded article, and the push-up part is arranged to face the air supply part, and a tip of the push-up part is branch into two parts.

Preferably, the rotary molding machine further comprises a base part, wherein the base part is configured to rotate around an axis, and the first mold is fixed to the base part.

BRIEF DESCRIPTION OF DRAWINGS

FIG. 4 is a perspective view in which a cylindrical part 3h1 of a camshaft 3h is positioned in the annular groove 5b of the cam track member 5.

FIG. 7 shows a state in which a part of a plate member 12C (within 90 degrees) is cut off for convenience of explanation.

DESCRIPTION OF EMBODIMENTS

Figure 1:
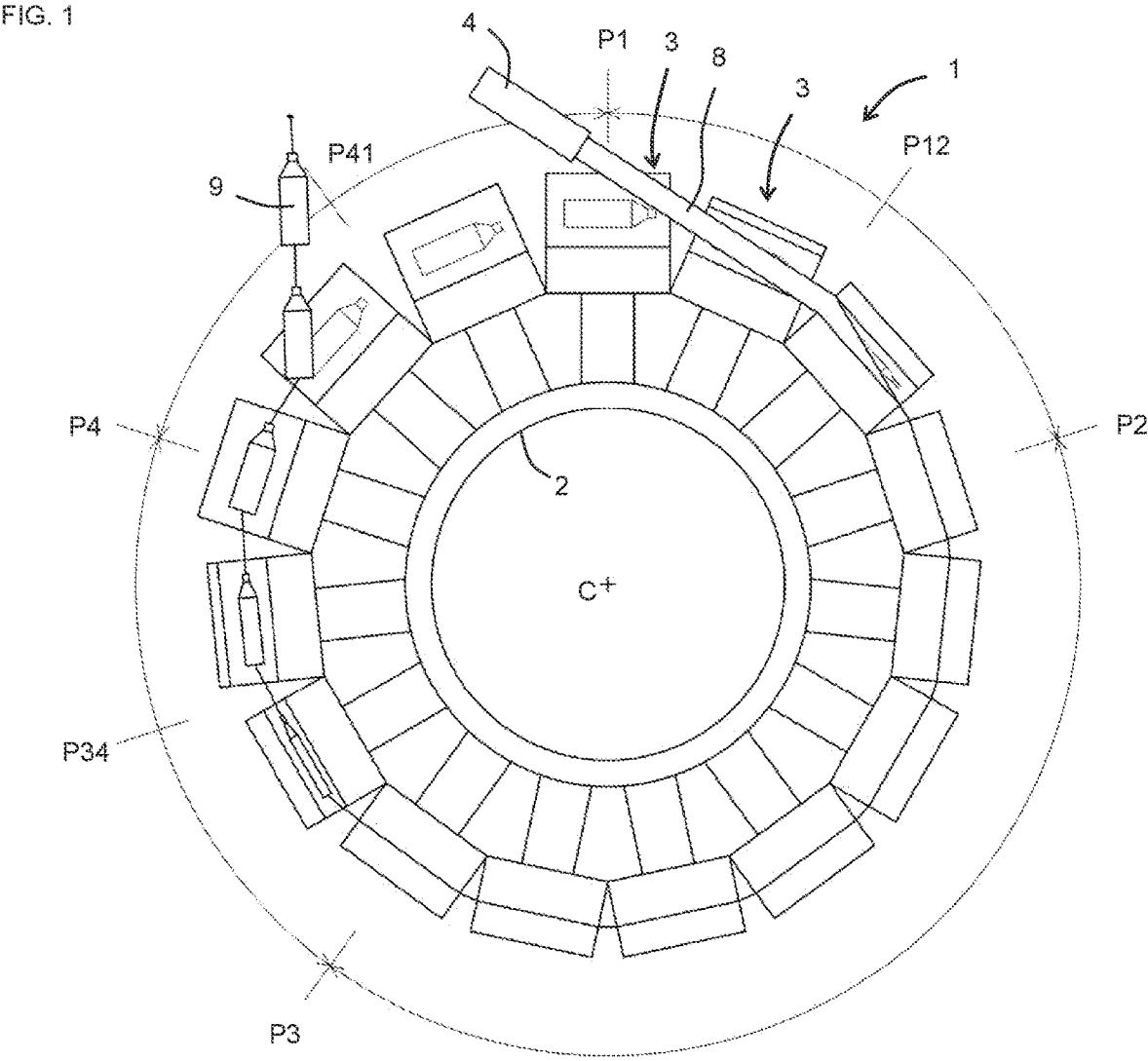
FIG. 1 is a front view of a rotary molding machine 1 according to an embodiment of the first viewpoint of the present invention.

Hereinafter, embodiments of the present invention will be described with reference to the drawings. Any of the embodiments described below can be combined with one another. And the invention is established independently for each feature.

First Viewpoint

1. Rotary Molding Machine 1

As shown in FIGS. 1 to 5, the rotary molding machine 1 of one embodiment of the present invention includes the base part (annular base) 2, a plurality of mold unit 3, the extrusion head 4, and the cam track member 5. In this embodiment, 15 mold unit 3 are equally spaced along the circumferential direction of the base part 2.

Figure 2:
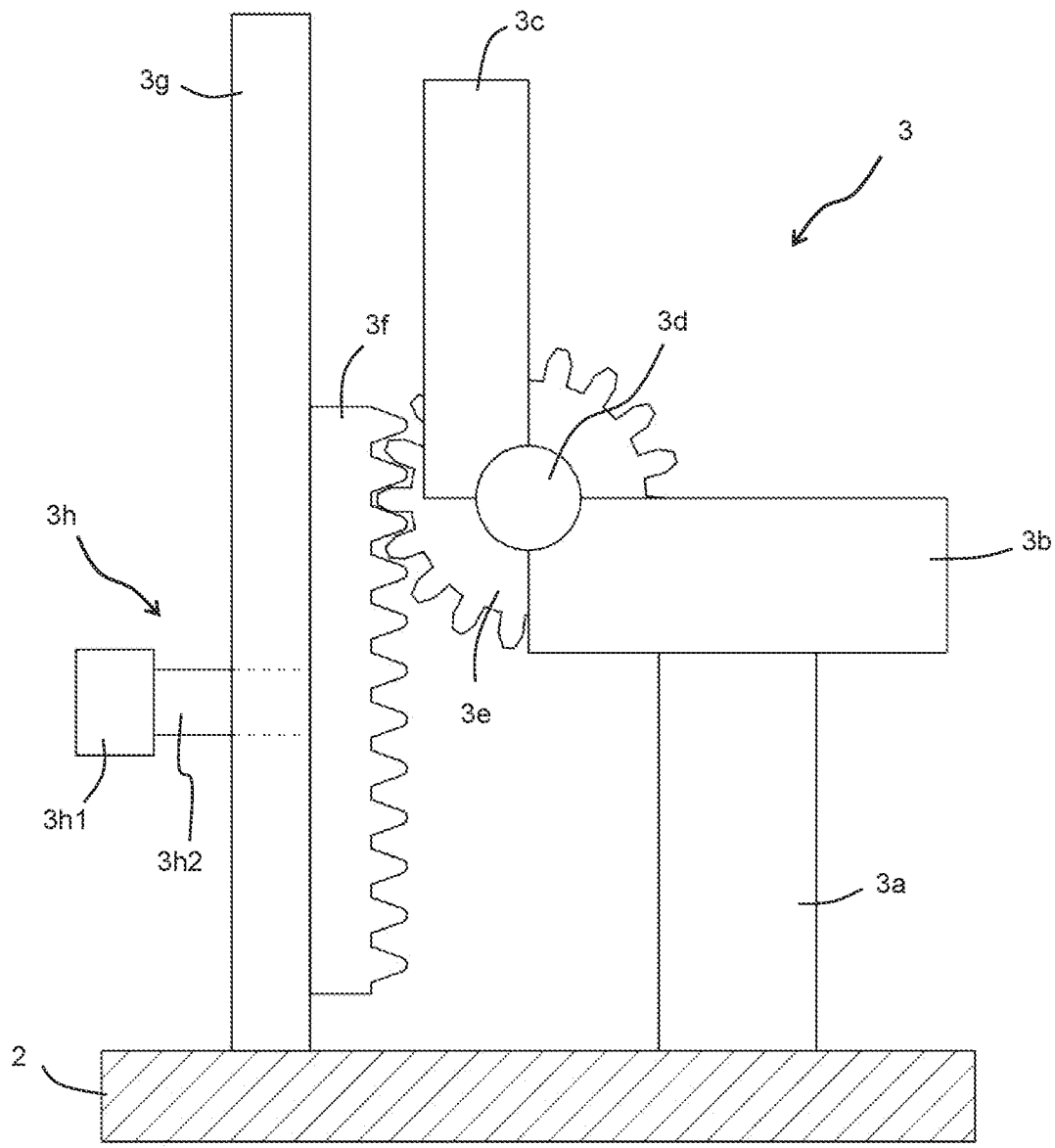
FIG. 2 is a left side view of the mold unit 3 at a position P1.

As shown in FIG. 2, each mold unit 3 includes a column 3a, the first mold (fixed mold) 3b, the second mold (movable mold) 3c, the hinge part 3d, the pinion gear 3e, the rack gear 3f, a support wall 3g, and the camshaft 3h. The camshaft 3h includes the cylindrical part 3h1 and a shaft part 3h2.

The column 3a and the support wall 3g are fixed to the base part 2. The first mold 3b is fixed to the column 3a. The second mold 3c is fixed to the first mold 3b through the hinge part 3d. Therefore, the first and second molds 3b and 3c are configured to open and close by rotating the second mold 3c around the hinge part 3d.

The pinion gear 3e is fixed to the second mold 3c, and the second mold 3c can be rotated by rotating the pinion gear 3e around the hinge part 3d. The rack gear 3f is connected to the support wall 3g through the linear guide (not shown). The shaft part 3h2 is fixed to the rack gear 3f. The shaft part 3h2 is fixed to the cylindrical part 3h1 through the bearing.

Figure 3A:
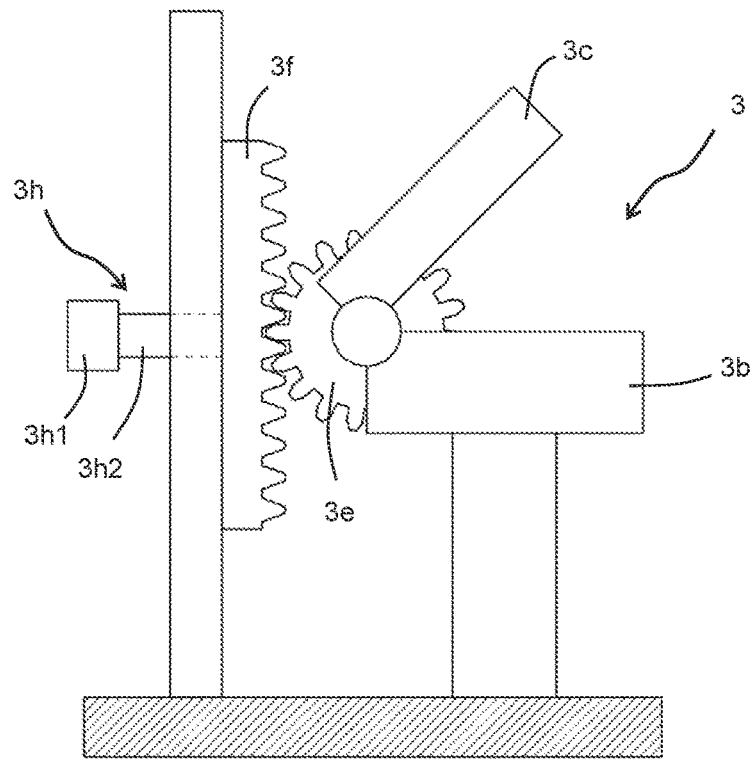
FIG. 3A is a left side view of mold unit 3 between the position P1 and a position P2.
Figure 3B:
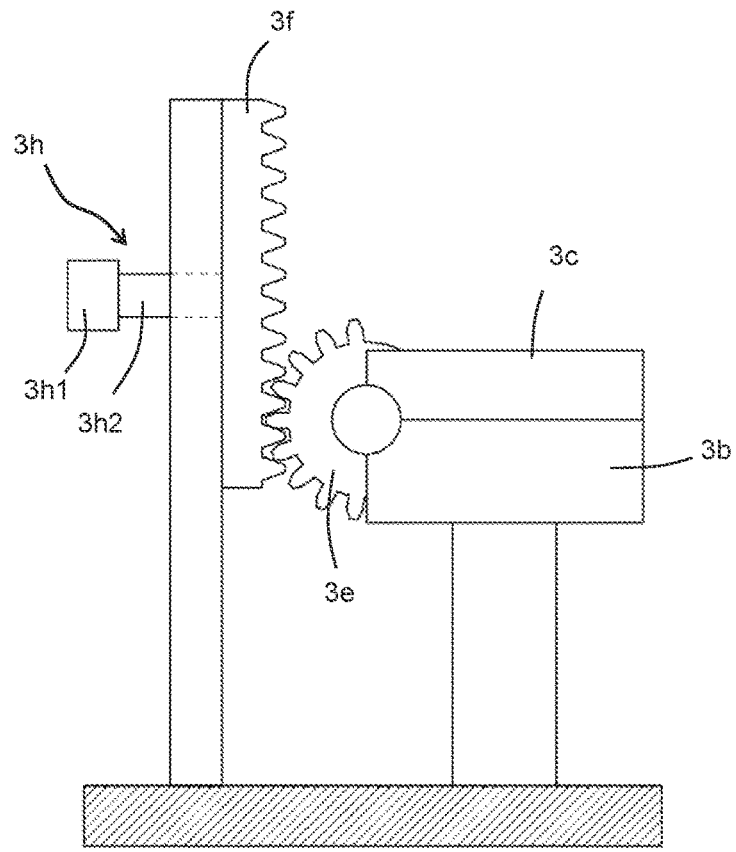
FIG. 3B is a left side view of mold unit 3 at the position P2.

FIG. 2 shows the state when molds 3b and 3c are most open, FIG. 3A shows the state when molds 3b and 3c are in the process of closing, and FIG. 3B shows the state after molds 3b and 3c are closed.

When the cylindrical part 3h1 rises from the state shown in FIG. 2, the shaft part 3h2 and the rack gear 3f rise together. As the rack gear 3f rises, the pinion gear 3e and the second mold 3c rotate clockwise and become the state shown in FIG. 3A. As the cylindrical part 3h1 rises further, the second mold 3c rotates further clockwise and becomes the state shown in FIG. 3B.

When the cylindrical part 3h1 goes down from the state shown in FIG. 3B, the shaft part 3h2 and the rack gear 3f go down together. As the rack gear 3f goes down, the pinion gear 3e and the second mold 3c rotate counterclockwise and become the state shown in FIG. 3a. As the cylindrical part 3h1 goes down further, the second mold 3c rotates further counterclockwise and becomes the state shown in FIG. 2.

In this way, the gear mechanism configured by the rack gear 3f and the pinion gear 3e converts the linear movement of the camshaft 3h into the rotational movement of the mold 3c, and opens and closes the molds 3b and 3c. The gear mechanism may be another mechanism that can convert the linear movement into the rotational movement.

Thus, moving the cylindrical part 3h1 up and down in parallel makes the molds 3b and 3c open and close.

The base part 2 can be rotated around the revolving axis C by a rotation driving mechanism (not shown). As the base part 2 rotates, the mold unit 3 also rotates. Therefore, as the base part 2 rotates, the molds 3b, 3c and the camshaft 3h rotate around the revolving axis C. The base part 2 rotates clockwise in FIG. 1.

Figure 5:
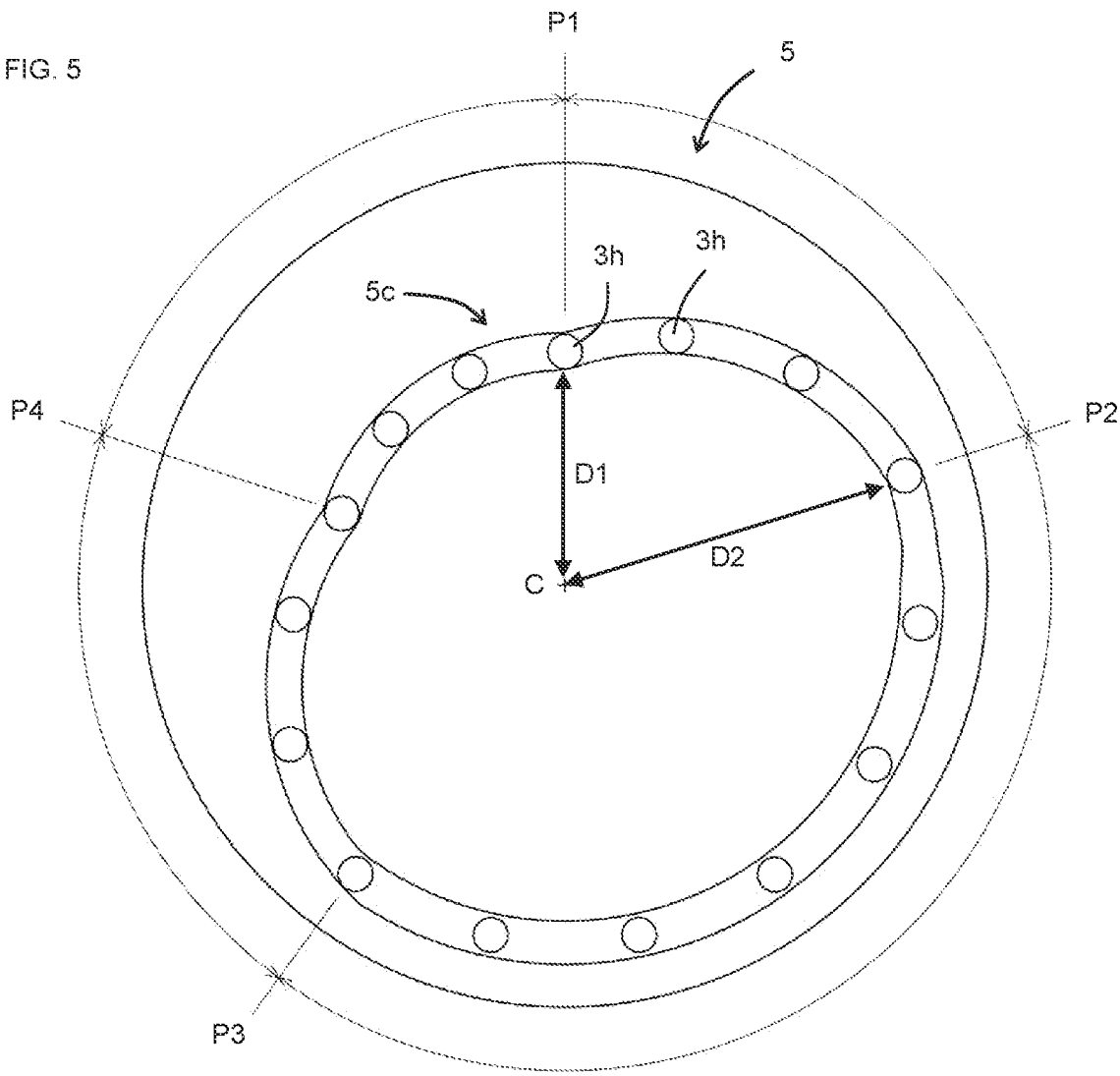
FIG. 5 is a front view in which the camshaft 3h of 15 mold unit 3 are positioned in the annular groove 5b of the cam track member 5.

As shown in FIGS. 4 and 5, the cam track member 5 has the base plate 5a, and the base plate 5a is provided with the annular groove 5b. The cam track 5c is configured by the annular groove 5b. The cylindrical part 3h1 of the camshaft 3h is positioned in the annular groove 5b. And as the base part 2 rotates, the cylindrical part 3h1 moves along the annular groove 5b (the cam track 5c), and as a result, the camshaft 3h and the rack gear 3f move along the annular groove 5b (the cam track 5c). Since the cam track 5c is provided on the base plate 5a, the opening and closing timing of the molds 3b and 3c can be easily changed by rotating the base plate 5a around the revolving axis C.

As shown in FIG. 5, the distance D from the revolving axis C to the cam track 5c varies along the circumferential direction. When the distances from the revolving axis C to the inner surface of the cam track 5c at the positions P1 and P2 are defined as D1 and D2, respectively, the following can be established.

The distance D is minimum (D1) at the position P1.
The distance D gradually increases while moving from the position P1 to the position P2.
The distance D is constant (D2) between the positions P2 and P3.
The distance D gradually decreases while moving from the position P3 to the position P4.
The distance D is constant (D1) between the positions P4 and P1.

Since the camshaft 3h moves along the cam track 5c, increasing or decreasing the distance D corresponds to the raising or lowering of the camshaft 3h in FIGS. 2 and 3. Therefore, moving the camshaft 3h along the cam track 5c can open and close the molds 3b and 3c.

The opening and closing motions of the molds 3b and 3c are as follows.
The molds 3b and 3c are in the most open state at the position P1.
The molds 3b and 3c gradually close while moving from the position P1 to the position P2.
The molds 3b and 3c are closed between the positions P2 and P3.
The molds 3b and 3c gradually open while moving from the position P3 to the position P4.
The molds 3b and 3c are in the most open state between the positions P4 and P1.

As shown in FIG. 4, because the side surface 5b1 of the annular groove 5b is vertical to the main surface of the base plate 5a, and the camshaft 3h moves while the peripheral surface of the cylindrical part 3h1 contacts the side surface 5b1 of the annular groove 5b, the camshaft 3h moves in parallel without changing its axial direction (longitudinal direction) X. When the axial directions at the positions P1 and P2 are defined as X1 and X2, respectively, the angle between the axial direction X2 when the molds 3b and 3c are closed (at the position P2) and the axial direction X1 when the molds 3b and 3c are most opened (at the position P1) is 0 degrees. The axial direction of the camshaft 3h matches the direction of the central axis of the cylindrical part 3h1.

It is also possible to change the axial direction X of the camshaft 3h by inclining the side surface of the annular groove 5b. However, the angle between the axial directions X1 and X2 is preferably 45 degrees or less, because a larger change in the axial direction X tends to make it difficult to form the cam track 5c or make the operation of the camshaft 3h unstable. For example, this angle may be 0, 5, 10, 15, 20, 25, 30, 35, 40, or 45 degrees, and may range between any two of the values given in the examples here.

In this embodiment, the revolving axis C is parallel to the horizontal plane, which makes it easy to insert the parison 8 between the molds 3b and 3c from the extrusion head 4 placed above the rotary molding machine 1. The parison 8 is made of molten resin and is preferable in the form of a tube, but may also be in the form of a sheet. The insertion direction of the parison 8 is preferably the tangential direction of the rotation track of the molds 3b and 3c. The angle between the revolving axis C and the horizontal plane is preferably 45 degrees or less, specifically, for example, may be 0, 5, 10, 15, 20, 25, 30, 35, 40, or 45 degrees, and may range between any two of the values given in the examples here.

2. Rotary Molding Method

The rotary molding can be performed using the rotary molding machine 1.

The rotary molding method of one embodiment of the present invention includes a parison insertion process, a molding process, and an ejection process.

In the parison insertion process, the parison 8 extruded from the extrusion head 4 is inserted between the molds 3b and 3c in the open state. Since the molds 3b and 3c are most opened between the positions P4 and P1, and then gradually closed while moving from the position P1 to the position P2, parison 8 can be inserted between molds 3b and 3c at the desired position from the position P4 to the position P2. However, if the parison 8 is inserted near the position P4, the extrusion head 4 and the parison 8 are likely to interfere with the molded article 9, and if the parison 8 is inserted near the position P2, the parison 8 is likely to interfere with the molds 3b and 3c, therefore, the parison insertion process is preferably performed between the central position P41, which is between the positions P4 and the position P1, and the central position P12, which is between the positions P1 and P2.

In the molding process, the molds 3b and 3c are used to form the parison 8. The cavity formed in the molds 3b and 3c has a shape corresponding to the outer shape of the molded article 9 in the closed state of the molds 3b and 3c, so the molded article 9 can be formed by molding using the molds 3b and 3c. The molding may be blow molding or vacuum molding.

In the ejection process, the molded article 9 is ejected from the opened molds 3b and 3c. The molds 3b and 3c gradually open while moving from position P3 to P4, and then become the most open between position P4 and P1. Therefore, the molded article 9 can be ejected at the desired position from position P3 to P1.

However, if the molded article 9 is ejected near the position P3, the molded article 9 are likely to interfere with the molds 3b and 3c, and if the molded article 9 is ejected near the position P1, the molded article 9 is likely to interfere with the extrusion head 4 and parison 8, therefore, the ejection process is preferably performed between the central position P34 of positions P3 and P4 and the central position P41 of positions P4 and P1. In order to avoid interference between the molds 3b, 3c, the molded article 9, and an ejector, it is preferable to eject the molded article 9 after the molds 3b and 3c are completely opened. Therefore, the ejection process is preferably performed between positions P4 and P1, and even more preferably between positions P4 and P41.

3. Other Embodiments

In the above embodiment, the cam track 5c is configured by the annular groove 5b, but the cam track 5c can also be configured by an annular projection provided on the base plate 5a.

Figure 6:
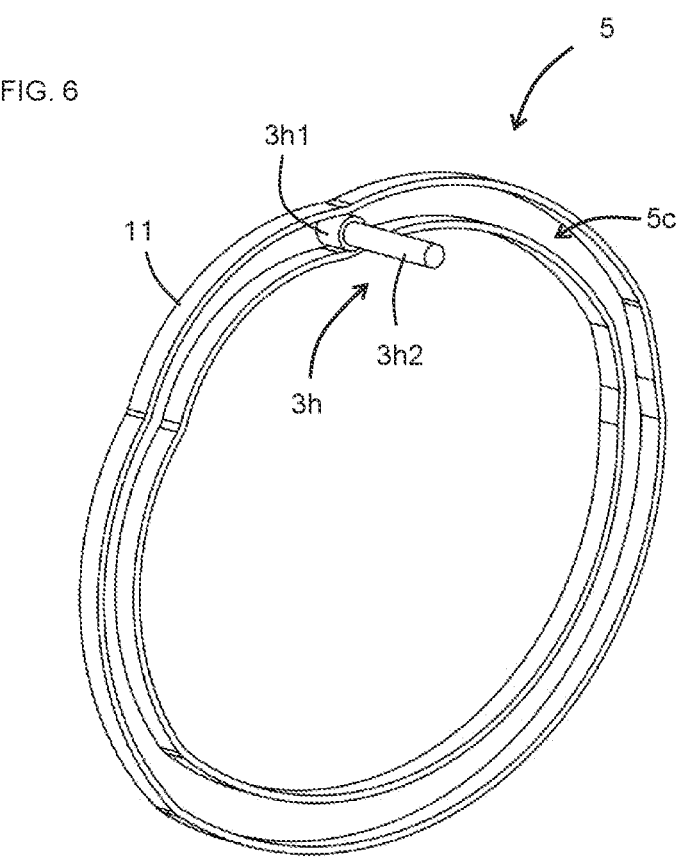
FIG. 6 is a perspective view showing a cam track 5c configured by a rail 13.

As shown in FIG. 6, the cam track 5c may be configured by the rail 13.

The molds 3b and 3c may be configured to open and close by rotating both molds 3b and 3c.

The molds 3b and 3c may be configured to open and close by approaching and separating one another in parallel.

The camshaft 3h may be directly connected to the molds.

The molds 3b and 3c may be configured to open and close at a constant speed, or they may be configured to open and close at varying speeds. For example, when the molds 3b, 3c move from the position P1 to the position P2, the speed of closing the molds 3b and 3c may be gradually increased. This makes it easier to avoid interference between parison 8 and mold 3c. The speed of opening and closing the molds 3b and 3c is adjustable by changing the configuration of the cam track 5c.

Second Viewpoint

1. Configuration and Operation of Rotary Molding Machine 1

Figure 7:
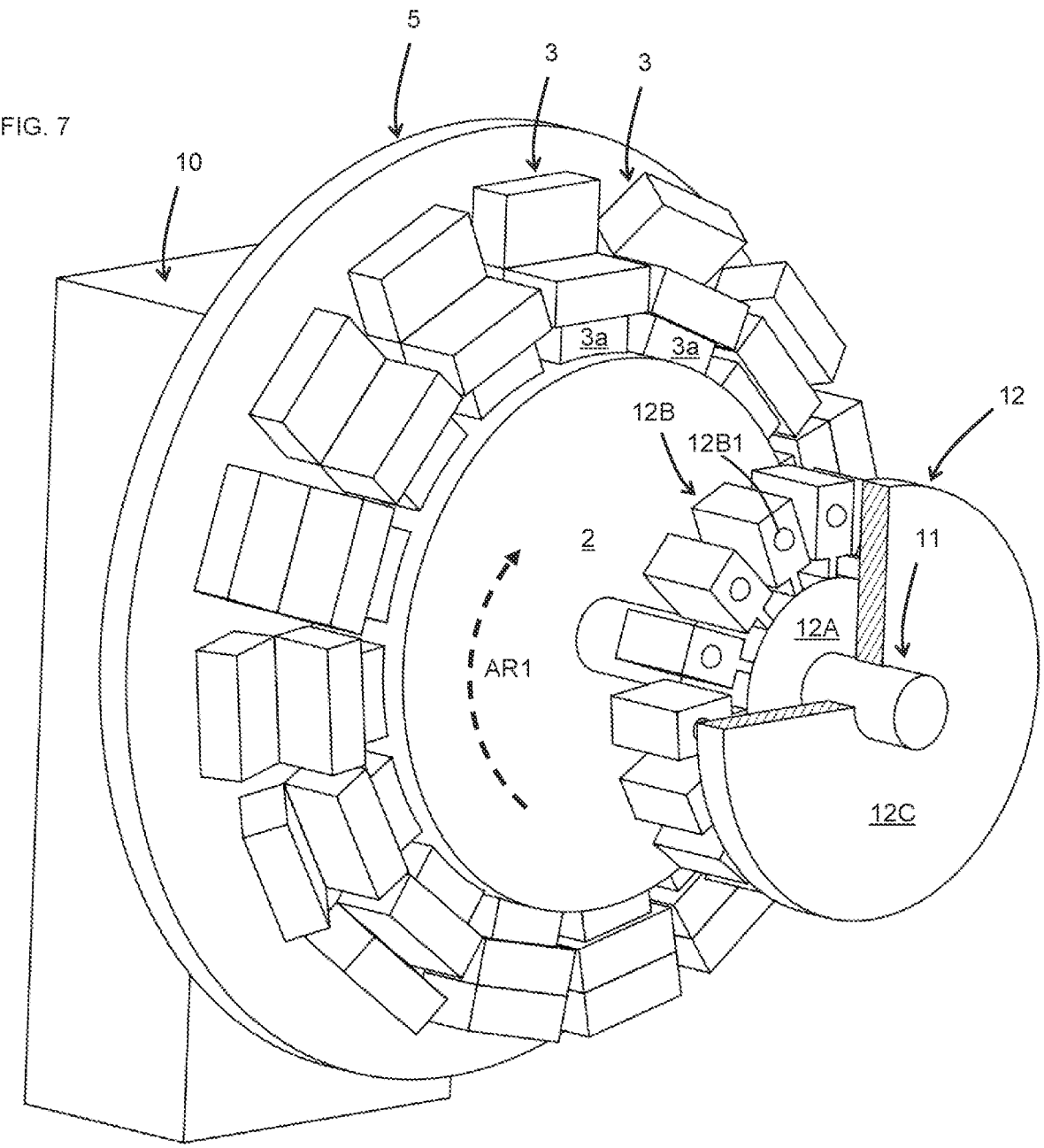
FIG. 7 is a perspective view of the rotary molding machine 1 according to an embodiment of the second viewpoint of the present invention.

As shown in FIG. 7, the rotary molding machine 1 of the embodiment includes the base part 2, a plurality of mold unit 3, the extrusion head 4 (see FIG. 8), the cam track member 5, a power mechanism 10, a shaft 11, and a switch mechanism 12. In this embodiment, 15 mold unit 3 are equally spaced along the circumferential direction of the base part 2.

1-2. Base Part 2

The base part 2 is connected to the shaft 11, and the base part 2 rotates around an axis as the shaft 11 rotates. In FIG. 7, the direction of rotation of the base part 2 is indicated by the arrow AR1. A plurality of mold unit 3 (15 in the embodiment) is attached to the circumference of the base part 2. As the base part 2 rotates, each mold unit 3 revolves around the revolving axis C. The base part 2 is arranged between the cam track member 5 and the switch mechanism 12.

1-3. Mold Unit 3

Figure 8:
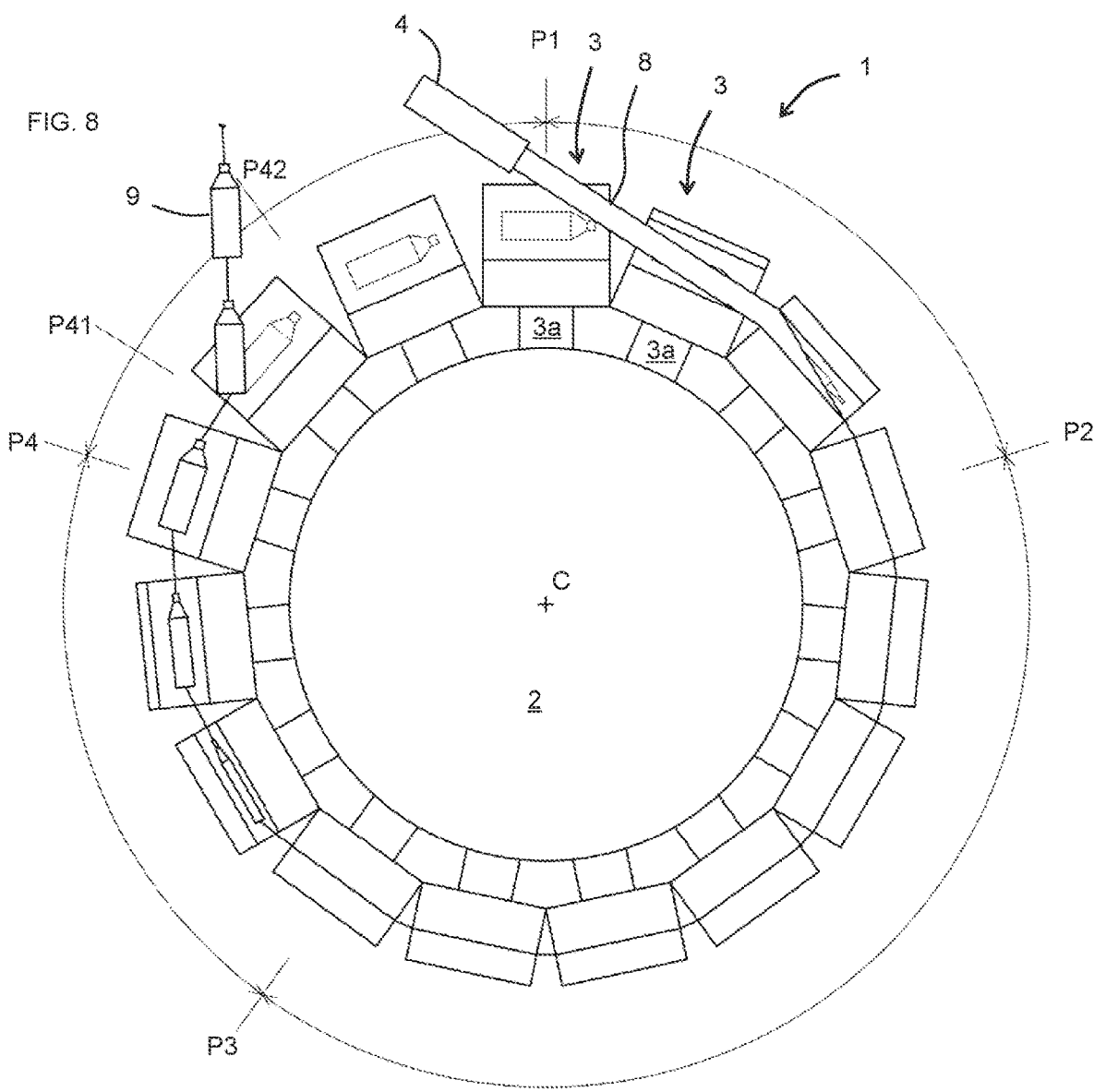
FIG. 8 is a front view of the rotary molding machine (a base part 2, a mold unit 3, and an extrusion head 4), the parison 8, and the molded article 9 shown in FIG. 7.
Figure 9:
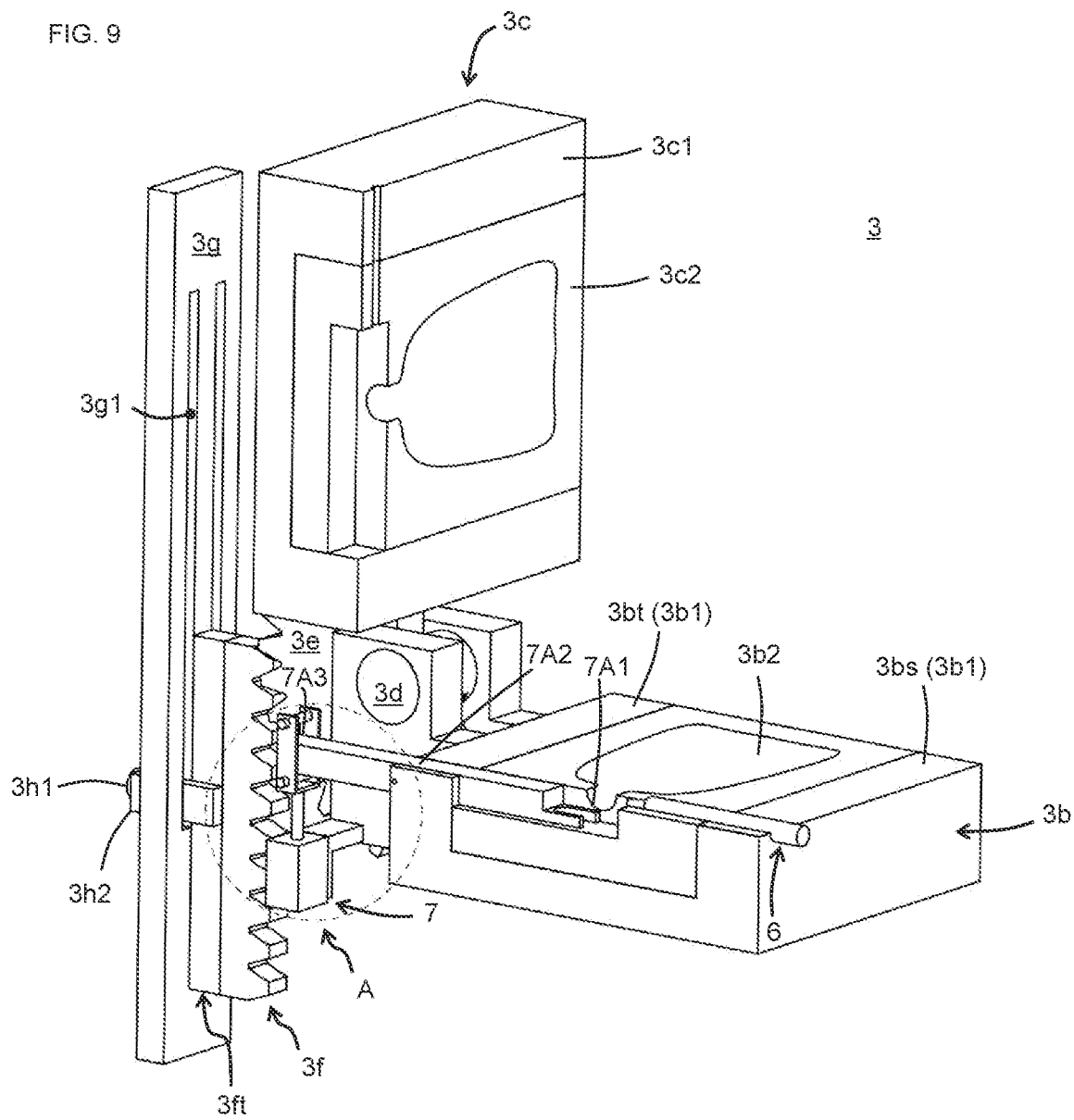
FIG. 9 shows a state when the mold unit 3 is fully open. The state shown in FIG. 9 is the mold unit 3 is from a position P4 to the position P1 shown in FIG. 5, and a push-up mechanism 7 is at the push-down state.
Figure 10:
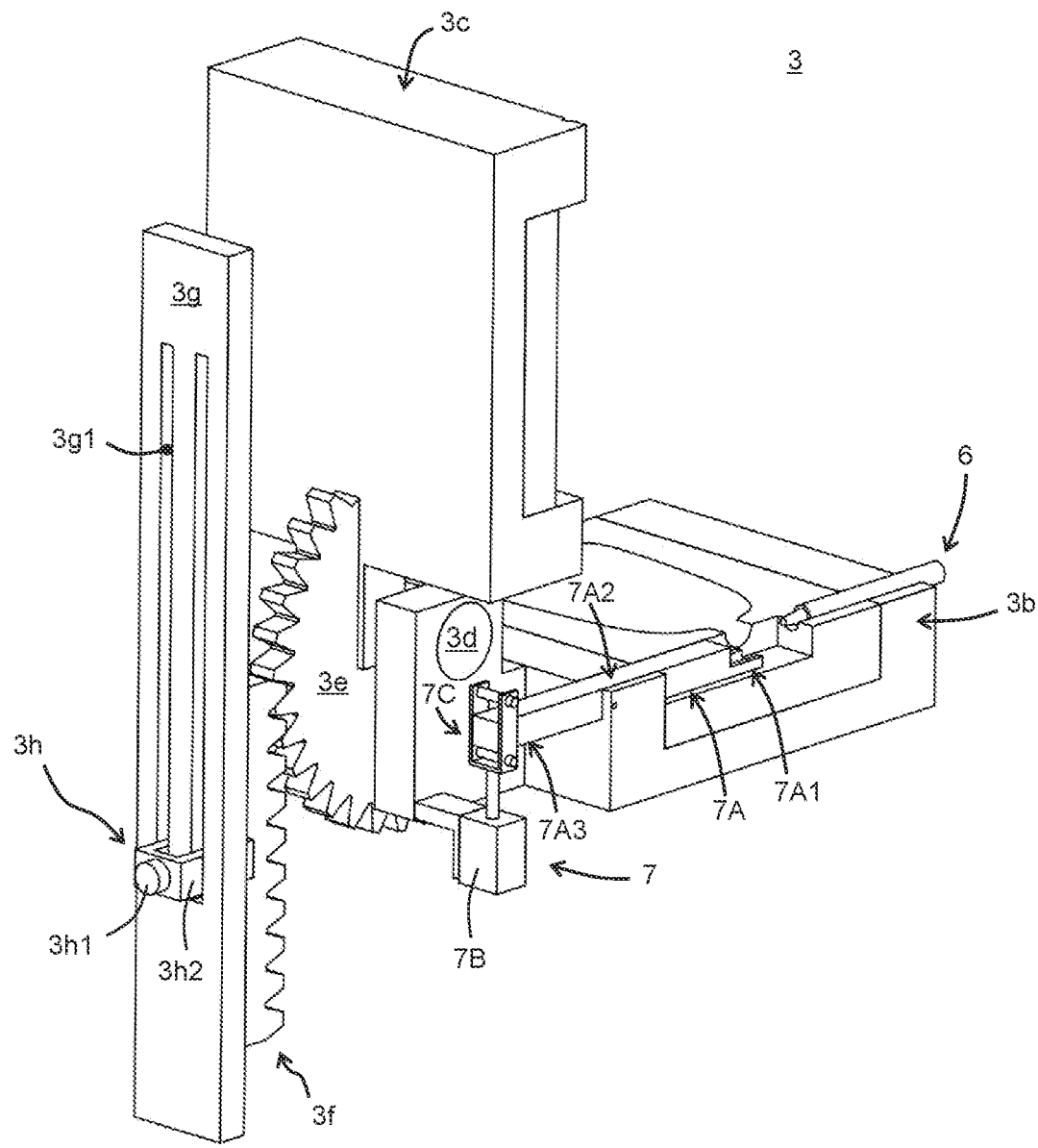
FIG. 10 is a perspective view of the mold unit 3 viewed from a direction different from the perspective direction of FIG. 9.
Figure 11:
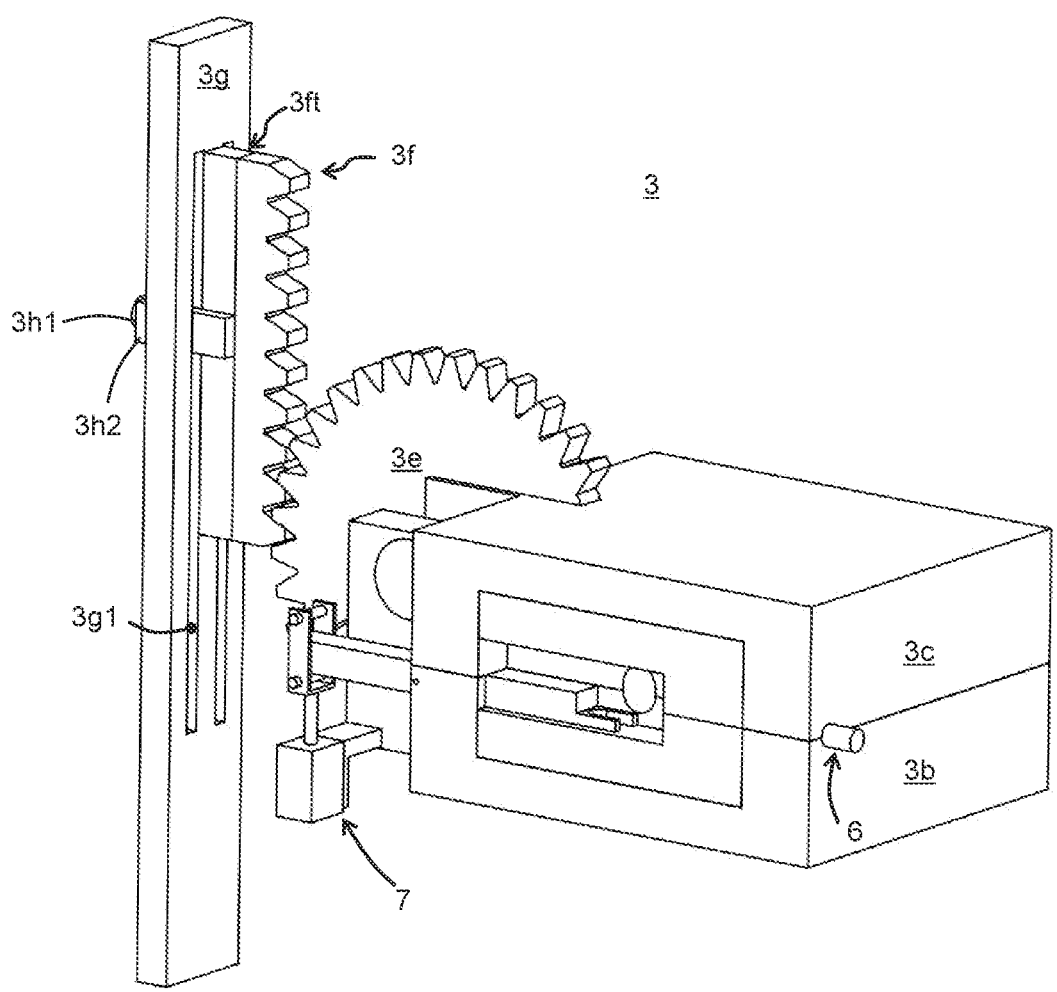
FIG. 11 shows a state when the mold unit 3 in FIG. 9 is fully closed. The state shown in FIG. 11 is the mold unit 3 is from the position P2 to the position P1 shown in FIG. 5.

As shown in FIGS. 9 and 10, each mold unit 3 includes the column 3a (see FIGS. 7 and 8), the first mold (fixed type) 3b, the second mold (movable type) 3c, the hinge part 3d, the pinion gear 3e, the rack gear 3f, the linear guide 3ft, the support wall 3g, the camshaft 3h, the air supply part 6, and the push-up mechanism 7.

1-3-1. Column 3A and Support Wall 3g

As shown in FIGS. 7 and 8, the column 3a is fixed to the base part 2. Also, the first mold 3b is fixed to the column 3a. In FIGS. 9 to 12, the column 3a is omitted from the figure.

The support wall 3g is also fixed to the base part 2 as well as the column 3a. The support wall 3g is the plate member formed so as to extend in the radial direction of the base part 2. The support wall 3g has a linear slit 3g1. In the embodiment, two rows of the slit 3g1 parallel to each other are formed in the support wall 3g. The slit 3g1 has the camshaft 3h (the shaft part 3h2 described below) inserted.

1-3-2. First and Second Molds 3b, 3c

As shown in FIGS. 9 and 10, the push-up mechanism 7 and the air supply part 6 are provided in the first mold 3b. In the embodiment, the push-up mechanism 7 is fixed to the first mold 3b, but it is not limited to this configuration, and the push-up mechanism 7 may be fixed to the base part 2, for example. The first mold 3b includes a first housing part 3b1 and the first cavity member 3b2. The first housing part 3b1 is configured to place the first cavity member 3b2. The first housing part 3b1 has the first and second arrangement parts 3bt and 3bs, and the first and second arrangement part 3bt and 3bs are separated by the first cavity member 3b2. The first cavity member 3b2 is housed in the first housing part 3b1, and a recess corresponding to the shape of the molded article 9 is formed in the first cavity member 3b2. A groove portion 3b11 (see FIG. 13) where the push-up member 7A of the push-up mechanism 7, to be described later, is placed is formed in the first mold 3b. Also, the shaft part 3b12, which supports the push-up member 7A so that it can rotate, is provided in the first mold 3b. In the embodiment, the shaft part 3b12 is provided in the first mold 3b, but it is not limited to this, and the shaft part 3b12 may be provided adjacent to the first mold 3b, rather than in the first mold 3b.

The second mold 3c includes the second housing part 3c1 and the second cavity member 3c2. The second housing part 3c1 is configured to place the second cavity member 3c2. The second cavity member 3c2 is housed in the second housing part 3c1, and a recess corresponding to the shape of the molded article 9 is formed in the second cavity member 3c2.

1-3-3. Hinge Part 3d and Pinion Gear 3e

As shown in FIGS. 9 and 10, the hinge part 3d is configured to rotate the second mold 3c relative to the first mold 3b. The second mold 3c is configured to open and close to the first mold 3b through the hinge part 3d. By rotating the second mold 3c around the hinge part 3d, the first mold 3b and the second mold 3c can be opened and closed.

The pinion gear 3e is fixed to the second mold 3c. As the pinion gear 3e rotates around the hinge part 3d, the second mold 3c rotates, and the first and second molds 3b and 3c open (see FIG. 9) or close (see FIG. 11).

1-3-4. RACK GEAR 3f AND LINEAR GUIDE 3ft

As shown in FIGS. 9 and 10, the rack gear 3f is connected to the pinion gear 3e, and the rack gear 3f is connected to the linear guide 3ft. The linear guide 3ft is attached to the support wall 3g so as to move along the surface of the support wall 3g. The camshaft 3h is fixed to the linear guide 3ft.

1-3-5. Camshaft 3h

As shown in FIG. 10, the camshaft 3h includes the cylindrical part 3h1 and the shaft part 3h2. The cylindrical part 3h1 is provided on one side of the shaft part 3h2, and the cylindrical part 3h1 is connected to the shaft part 3h2 through the bearing. The cylindrical part 3h1 is inserted into the cam track 5c (see FIG. 4), which is formed on the cam track member 5.

The shaft part 3*h*2 is inserted through the slit 3*g*1. As shown in FIGS. 9 and 10, The cylindrical part 3*h*1 is provided on one side of the shaft part 3*h*2, and the linear guide 3*fi* is provided on the other side of the shaft part 3*h*2. The shaft part 3*h*2 is fixed to the linear guide 3*fi*. As the cylindrical part 3*h*1 moves, the linear guide 3*fi* moves, and as a result, the pinion gear 3*e* rotates and the second mold 3*c* rotates.

1-3-6. Air Supply Part 6

As shown in FIG. 9, the air supply part 6 is provided in the first mold 3*b*. During molding, the air supply part 6 sticks into the parison, and air is blown into the parison from the air supply part 6. This causes the parison to swell and form into the desired shape.

1-3-7. Push-Up Mechanism 7 the push-up mechanism 7 includes the push-up member 7A and the driving mechanism. The driving mechanism of the push-up mechanism 7 includes the driving part 7B and the engaging member 7C.

1-3-7-1. Push-Up Member 7A

Figure 12:
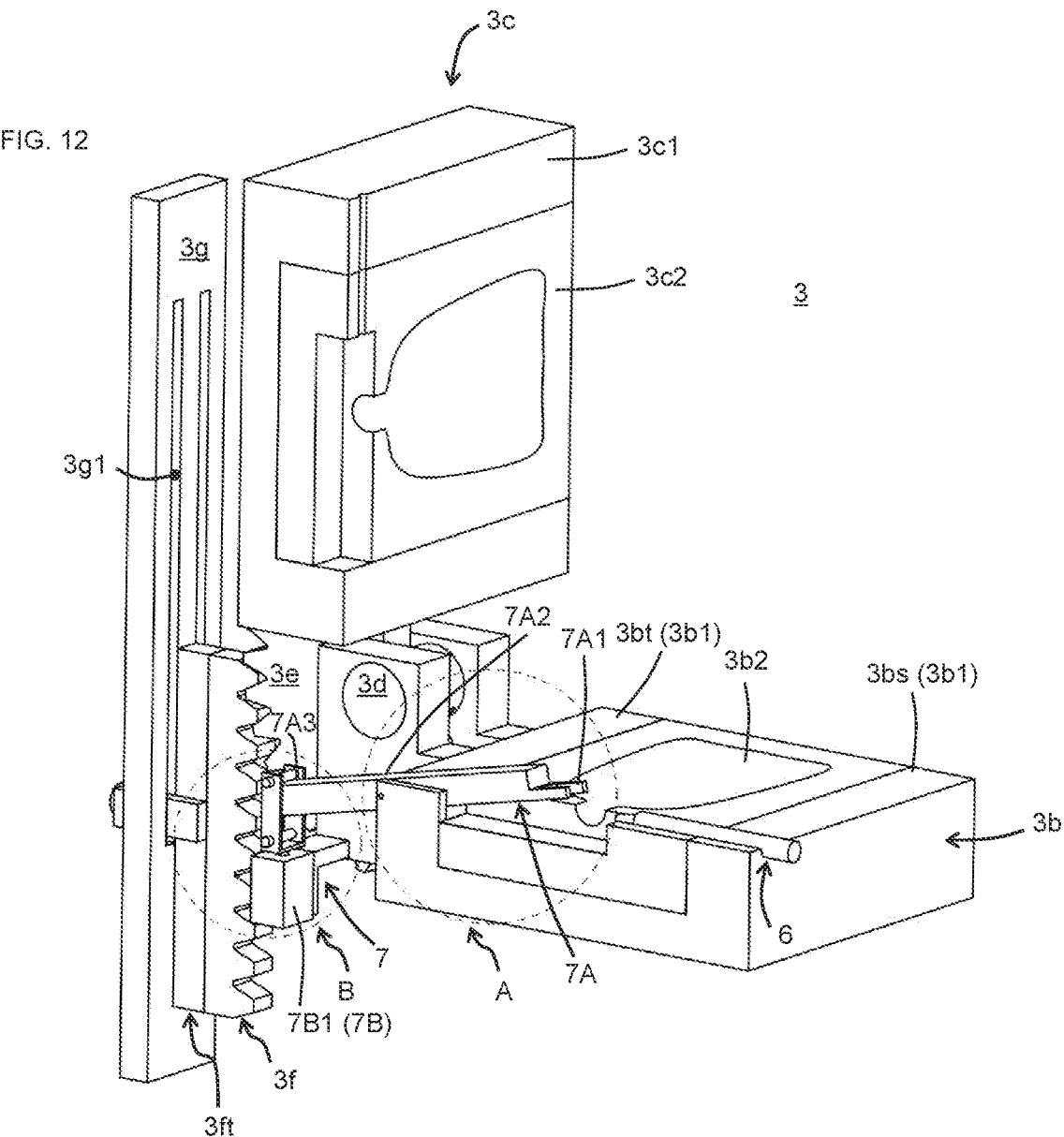
FIG. 12 is a perspective view of the push-up mechanism 7 of the mold unit 3 at the push-up state.

As shown in FIGS. 9 and 12, the push-up member 7A is a rod-shaped member, and the push-up member 7A includes the push-up part 7A1, the shaft support part 7A2, and the contact part 7A3. The direction of rotation of the push-up member 7A is the same as the direction of opening of the first and second molds 3*b* and 3*c* (direction of rotation of the second mold 3*c*). Here, the air supply part 6 described above is provided in the second arrangement part 3*bs* of the first housing part 3*b*1 of the first mold 3*b*, while the push-up member 7A is provided in the first arrangement part 3*bt* of the first housing part 3*b*1 of the first mold 3*b*. That is, the push-up member 7A is not provided in the side where the air supply part 6 is provided, and the push-up member 7A is arranged to face the air supply part 6 in the direction from the first arrangement part 3*bt* to the second arrangement part 3*bs*.

As shown in FIGS. 9, 10, 12, and 13, the push-up part 7A1 is provided in one side (one end side) of the push-up member 7A. The push-up part 7A1 is movable from the first position to the second position as described below. As the push-up part 7A1 moves from the first position to the second position, the molded article is pushed up. Also, as the push-up part 7A1 moves from the second position to the first position, the parison can be placed on the first mold 3*b* again.

Figure 13:
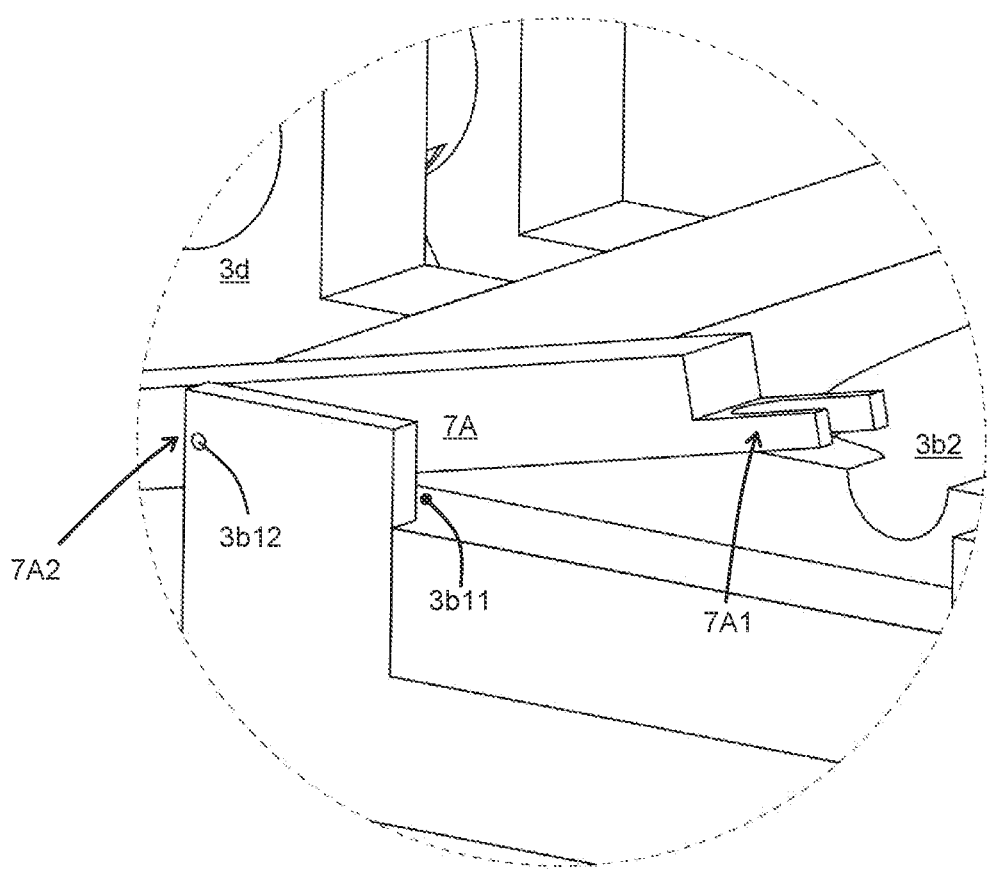
FIG. 13 is an enlarged view of an area A shown in FIG. 12.

The first position in the embodiment is the position of the push-up part 7A1 when the push-up part 7A1 goes down to the lowest point, as shown in FIGS. 9 and 10. Also, the second position in the embodiment is the position of the push-up part 7A1 when the push-up part 7A1 rises to the highest point, as shown in FIG. 13. Then, the second position is farther away from the first mold 3*b* than the first position.

The first position is not limited to the position of the push-up part 7A1 when the push-up part 7A1 goes down to the lowest point. Also, the second position is also not limited to the position of the push-up part 7A1 when the push-up part 7A1 rises to the highest point. The second position should be farther away from the first mold 3*b* than the first position.

Figure 14:
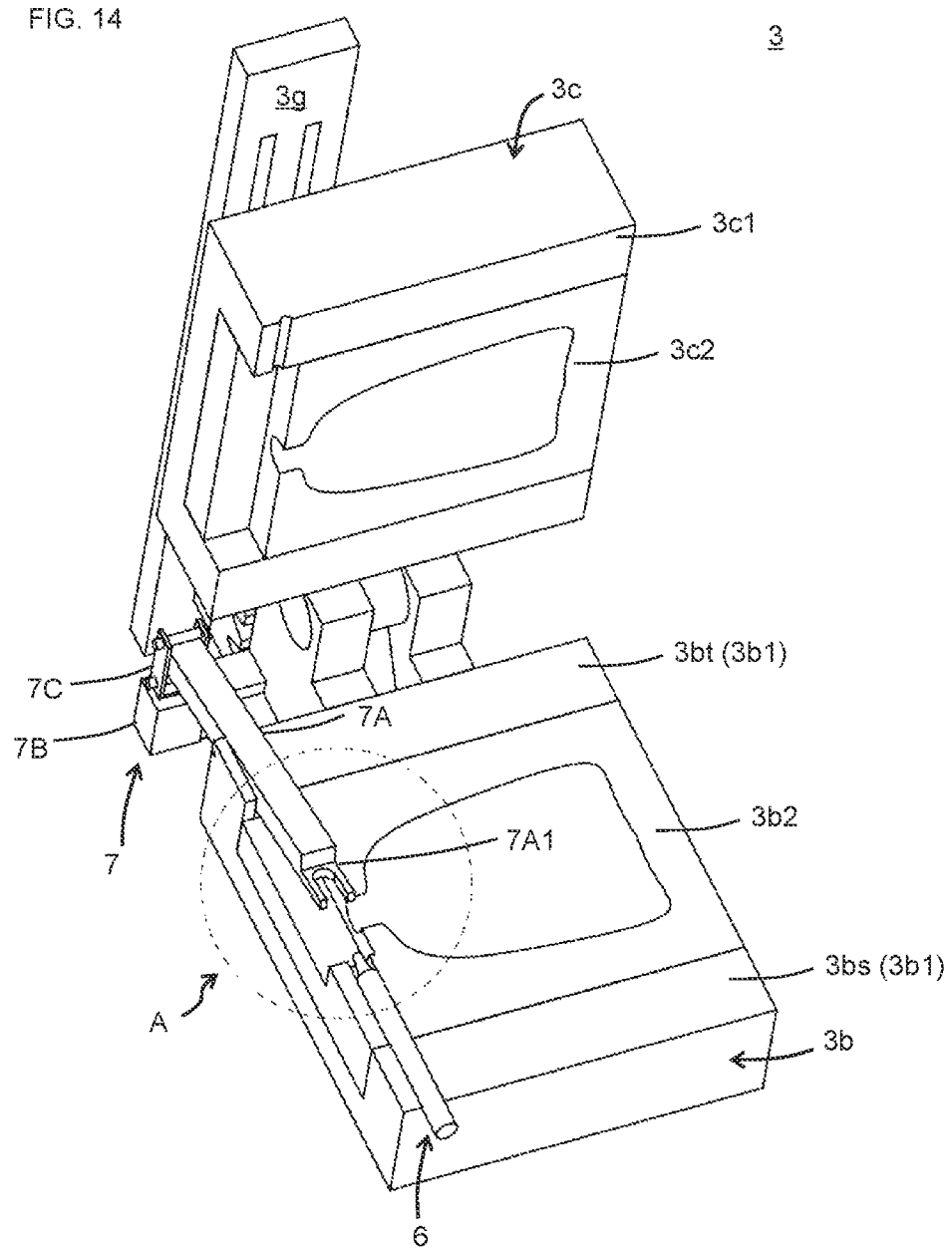
FIG. 14 is a perspective view of the mold unit 3 viewed from a direction different from the perspective direction of FIG. 12.
Figure 15:
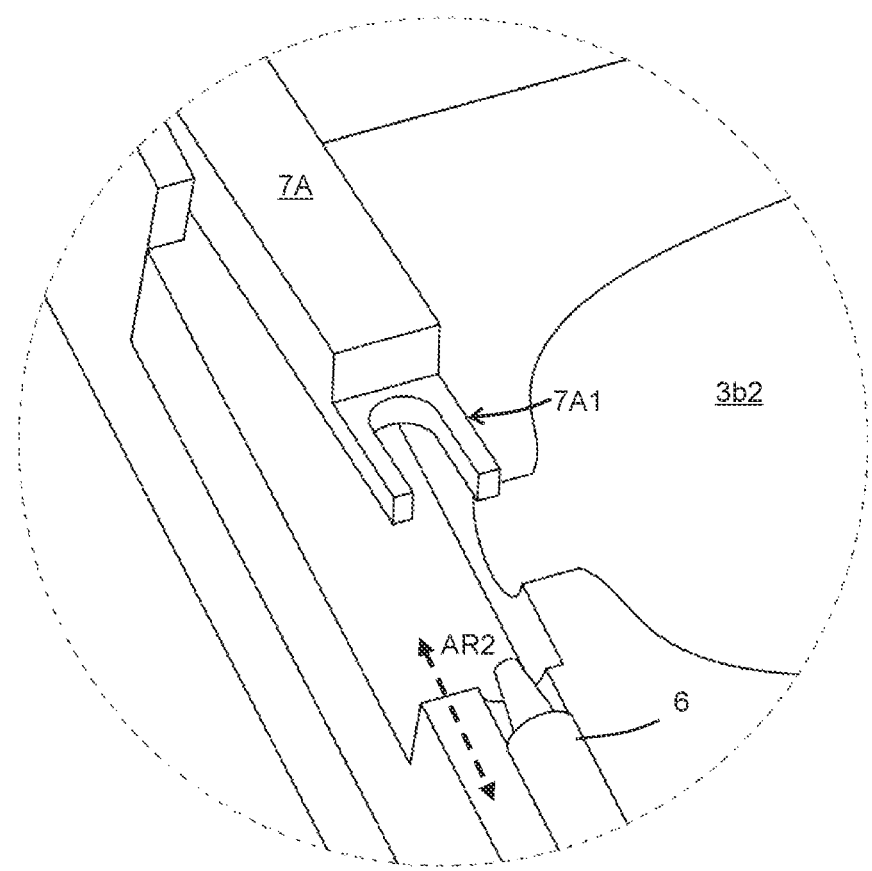
FIG. 15 is an enlarged view of an area A shown in FIG. 14.

As shown in FIGS. 14 and 15, the push-up part 7A1 is arranged to face the air supply part 6. Also, the air supply part 6 can be movable in the forward and backward directions, as shown by the arrow AR2 in FIG. 15. If the air supply part 6 moves to the front side when the push-up part 7A1 moves from the first position to the second position or from the second position to the first position, there is a risk of interference between the push-up part 7A1 and the tip of the air supply part 6. For example, the air supply part 6 is caught in the molded article, and the air supply part 6 does not move to the backside to escape from the push-up part 7A1, but remains in the front side. In such a case, if the push-up part 7A1 is driven, there is a risk of interference between the push-up part 7A1 and the air supply part 6. For this reason, in the embodiment, a tip part of the push-up part 7A1 is branch into two parts, as shown in FIG. 15.

As shown in FIGS. 9 and 10, the shaft support part 7A2 is provided between the push-up part 7A1 and the contact part 7A3. The shaft support part 7A2 is axially supported by the first mold 3*b*. Specifically, as shown in FIGS. 12 and 13, the shaft support part 7A2 is connected to the shaft part 3*b*12 provided in the first mold 3*b*, and the shaft support part 7A2 is rotatable around the shaft part 3*b*12.

Here, if the push-up part 7A1 is at the second position and the entire shaft support part 7A2 is extended out of the groove portion 3*b*11, the shaft support part 7A2 may not return into the groove portion 3*b*11 because the lower part of the shaft support part 7A2 contacts the wall of the groove portion 3*b*11 when the push-up part 7A1 goes down. Therefore, as shown in FIG. 13, at least one part of the shaft support part 7A2 is contained within the groove portion 3*b*11 when the push-up part 7A1 is at the second position (see FIG. 13). This prevents the shaft support part 7A2 from being difficult to return into the groove portion 3*b*11.

Here, the length x1 is defined as the longitudinal length of the push-up member 7A from the tip part of the push-up part 7A1 to the rotation axis of the shaft support part 7A2. The position of the rotation axis of the shaft support part 7A2 corresponds to the position where the shaft part 3*b*12 is provided.

Also, the length x2 is defined as the longitudinal length of the push-up member 7A from the rotation axis of the shaft support part 7A2 to the contact position of the contact part 7A3. The contact position of the contact part 7A3 is the position where the contact part 7A3 contacts the first engaging part 7C2 or the second engaging part 7C3.

In the embodiment, the length x2 is longer than the length x1. This allows the principle of leverage to work effectively on the push-up member 7A, and suppresses the driving force required for the driving part 7B.

Figure 16A:
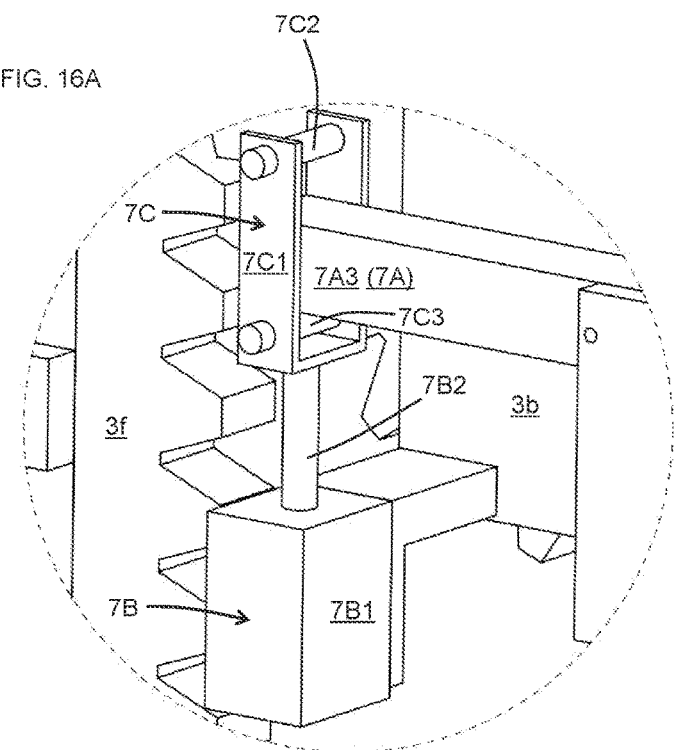
FIG. 16A is an enlarged view of an area A shown in FIG. 9.
Figure 16B:
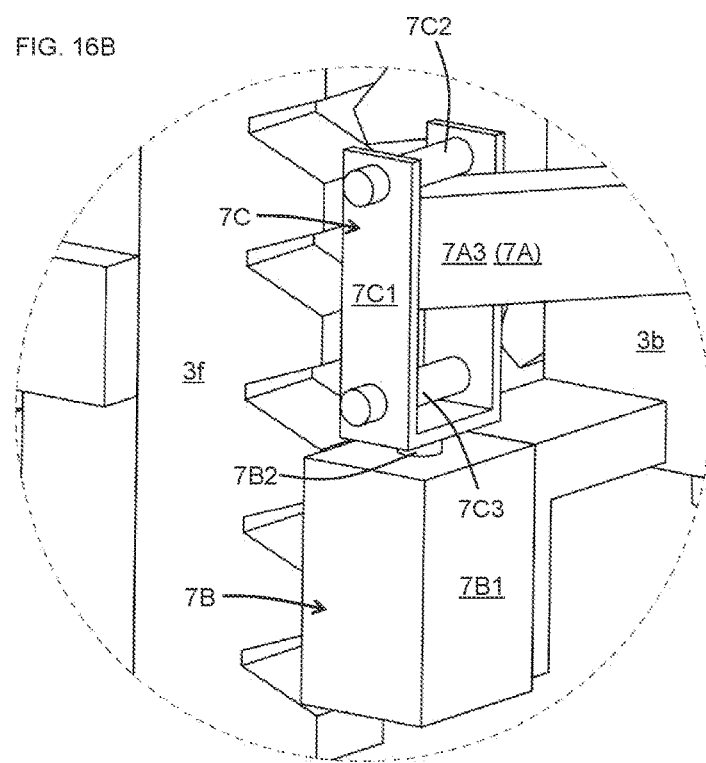
FIG. 16B is an enlarged view of an area B shown in FIG. 12.

As shown in FIGS. 16A and 16B, the contact part 7A3 is provided in another side of the push-up member 7A. The contact part 7A3 is the part that contacts the engaging member 7C. As the engaging member 7C is driven (moved), the contact part 7A3 moves. In the embodiment, the contact part 7A3 is not connected to the engaging member 7C. If the contact part 7A3 and the engaging member 7C are connected, the driving part 7B would need to be equipped with a mechanism that moves the engaging member 7C in an arc, or a mechanism with the shaft part that connects the engaging member 7C to the contact part 7A3, for example. That is, if the contact part 7A3 and the engaging member 7C are connected, the mechanism of the driving part 7B and the engaging member 7C will be complex and the cost of the rotary molding machine 1 will increase.

Also, the rotary molding machine 1 has a plurality of mold unit 3, and since the space between each mold unit 3 is relatively small, it is difficult for the rotary molding machine 1 to provide space for the placement of various members. In the embodiment, the push-up member 7A and the engaging member 7C are simple in configuration and their size is minimized, so that a plurality of the push-up mechanism 7 can be easily attached to the rotary molding machine 1. In addition, since the push-up mechanism 7 is reduced in size, the rotary molding machine 1 is also reduced in size.

In the embodiment, as described above, the contact part 7A3 and the engaging member 7C are not connected, but only engaged. Then, in the embodiment, the push-up part 7A1 can be moved between the first and second positions only by the linear motion of the engaging member 7C. Therefore, the embodiment can move the push-up part 7A1 properly while suppressing the complexity of the mechanism, suppressing the cost increase of the rotary molding machine 1, improving the installation of the push-up mechanism 7, and suppressing the size increase of the rotary molding machine 1.

1-3-7-2. Driving Part 7B

The driving part 7B has the function of driving the engaging member 7C to move the push-up part 7A1 from the first position to the second position. The driving part 7B can employ a system that drives the push-up member 7A by hydraulic pressure or drives the push-up member 7A by a motor, but in the embodiment, the driving part 7B employs a system that drives the push-up member 7A by air. This prevents the rotary molding machine 1 from getting dirty with oil, increasing the size of the rotary molding machine 1, and increasing the weight of the rotary molding machine 1.

As shown in FIGS. 16A and 16B, the driving part 7B includes the air cylinder 7B1 and the piston 7B2. The air cylinder 7B1 is fixed to the first mold 3b. The air cylinder 7B1 is supplied with air from an air tube (not shown) and has the function of moving the piston 7B2 in a linear direction. The piston 7B2 is connected to the engaging member 7C.

In the above-mentioned patent literature 2, the guide member can rotate the push-up member. On the other hand, the surface of the guide member needs to have a three-dimensional and complex curved surface to allow the push-up member to push up the molded article properly. It is very difficult to manufacture the guide member, and it is difficult to ensure the accuracy of the operation of the push-up member. In the embodiment, the driving part 7B is employed instead of the guide member, which can avoid such a problem.

1-3-7-3. Engaging Member 7C

As shown in FIGS. 16A and 16B, the engaging member 7C includes the flame 7C1 and the first and second engaging parts 7C2 and 7C3. The flame 7C1 is connected to the piston 7B2 and is movable with the piston 7B2. Also, the engaging member 7C is engaged with the push-up member 7A (the contact part 7A3) at the first and second positions. Specifically, the first engaging part 7C2 is provided on the side farther away from the air cylinder 7B1 than the second engaging part 7C3. The push-up member 7A (the contact part 7A3) is placed between the first engaging part 7C2 and the second engaging part 7C3. The form and shape of the engaging member 7C can be changed as needed.

When the push-up part 7A1 is at the first position (see FIG. 9), the contact part 7A3 is engaged with the second engaging part 7C3, as shown in FIG. 16A. Therefore, the contact part 7A3 is restricted from moving in the direction in which the contact part 7A3 is pushed down.

Also, when the push-up part 7A1 is at the second position (see FIG. 12), the contact part 7A3 is engaged with the first engaging part 7C2, as shown in FIG. 16B. therefore, the contact part 7A3 is restricted from moving in the direction in which the contact part 7A3 is pushed up.

Thus, in the rotary molding machine 1 according to the embodiment, since the engaging member 7C is engaged with the push-up member 7A at both the first and second positions, the wandering of the push-up member 7A is suppressed at both the first and second positions. That is, in the rotary molding machine 1 according to the embodiment, the wandering of the push-up member 7A in the preliminary stage of the molding of the molded article is suppressed, the molded article can be more reliably formed into the desired shape.

Also, the parison is in contact with the first mold 3b, which cools the part corresponding to the body of the molded article 9. This makes it easier for the parison to swell properly. Here, as described above, since the wandering of the push-up member 7A is suppressed, it is possible to avoid the parison inserted into the mold unit 3 coming into contact with the push-up member 7A before the first mold 3b. As a result, it is possible to suppress cooling from the part corresponding to the opening of the molded article 9 and prevent the parison from not being properly swelled.

1-4. Extrusion Head 4

As shown in FIG. 8, the extrusion head 4 is placed above the mold unit 3 at position P1. The extrusion head 4 is configured to insert a parison 8 into the mold unit 3 at position P1. The parison 8 is made of molten resin and is preferable to be a tube, but may be a sheet.

1-5. Cam Track Member 5

As explained in the first viewpoint, the molds 3b, 3c are opened and closed by moving the camshaft 3h along the cam track 5c of the cam track member 5, as shown in FIGS. 4 and 5. As the camshaft 3h moves, the distance D from the revolving axis C increases or decreases. The increase or decrease of distance D corresponds to the raising or lowering of the camshaft 3h.

As the cylindrical part 3h1 rises, the shaft part 3h2 and the rack gear 3f rise with it. As the rack gear 3f rises, the pinion gear 3e and the second mold 3c rotate clockwise.

As the cylindrical part 3h1 goes down, the shaft part 3h2 and the rack gear 3f also go down with it. As the rack gear 3f goes down, the pinion gear 3e and the second mold 3c rotate counterclockwise.

In this way, the linear movement of the camshaft 3h is converted into the rotational movement of the second mold 3c, and the second mold 3c is opened and closed through the gear mechanism configured by the rack gear 3f and the pinion gear 3e. The gear mechanism may be another mechanism that can convert the linear movement into the rotational movement.

1-6. Power Mechanism 10 and Shaft 11

The power mechanism 10 shown in FIG. 7 is composed of a motor, etc., and has the function of rotating the shaft 11. As shown in FIG. 7, one end of the shaft 11 is connected to the power mechanism 10, and the other end of the shaft 11 is connected to the bearing omitted in the figure. The shaft 11 is connected to the base part 2 and the base part 12A of the switch mechanism 12 (described below), and as the shaft 11 rotates, the base part 2 and the base part 12A rotate.

1-7. Switch Mechanism 12 and Controller 1-7-1. Configuration Description

The switch mechanism 12 shown in FIG. 7 has the function of outputting the timing data for supplying air to the air cylinder 7B1 to the controller (not shown in the figure). Here, the controller controls the air supply device (not shown in the figure), which is configured to supply air through air tubes to the air cylinder 7B1. Also, the timing for supplying air to the air cylinder 7B1 corresponds to the timing for driving the engaging member 7C.

The switch mechanism 12 includes the base part 12A, switch part 12B, and the plate member 12C. The base part 12A is connected to the shaft 11. On the other hand, the plate member 12C is configured so that the shaft 11 is inserted, but the plate member 12C does not rotate with the shaft 11. The rotary molding machine 1 is provided with the number of the switch parts 12B corresponding to the number of mold unit 3, in the embodiment, there are 15 the switch parts 12B.

Each of the switch parts 12B is provided with the switch 12B1 arranged to face the surface of the plate member 12C. Also, the plate member 12C has a protruding part (not shown in the figure), which is formed at a position corresponding to the timing of raising the push-up part 7A1, for example. When the switch part 12B is rotating with the base part 12A, and the switch part 12B passes the protruding part of the plate member 12C, the switch 12B1 is pushed in by the protruding part. This allows the controller to acquire the timing data for supplying air to the push-up mechanism 7 of the mold unit 3 corresponding to the pushed-in switch 12B1.

1-7-2. Control of Driving Part 7B by Controller

In an embodiment, the controller controls the driving part 7B (the air supply device) so that the push-up part 7A1 rises (movable from the first position to the second position) at the first timing. At the first timing, the second mold 3c is fully opened. The first timing means the timing when the mold unit 3 is positioned at position P41. Position P41 is the position between the position P4 and the position P1. Since the controller controls the air supply device so that the push-up part 7A1 rises at the first timing, the interference of the molded article with the second mold 3c is prevented and the molded article is smoothly ejected from the first mold 3b.

Also, the controller controls the driving part 7B (the air supply device) so that the push-up part 7A1 goes down (movable from the second position to the first position) at the second timing. At the second timing, the second mold 3c is fully opened, and the second timing is after the molded article is ejected from the first mold 3b (after it is pushed out). The second timing means the timing when the mold unit 3 is positioned at the position P42.

The mold unit 3 is provided with a sensor (not shown in the figure) that detects whether the molded article has been ejected from the first mold 3b and whether the push-up part 7A1 is in the raised state. The controller can acquire data related to the second timing from this sensor.

Then, the controller controls the air supply device so that the push-up part 7A1 goes down at the second timing, so that the interference between the next parison and the push-up part 7A1 is avoided, and the parison is smoothly reinserted on the first mold 3b.

2. Rotary Molding Method

The rotary molding method according to the embodiment is performed using the rotary molding machine 1.

The rotary molding method according to the embodiment includes the parison insertion process, the molding process, and the ejection process.

2-1. Insertion Process

In the parison insertion process, the parison 8 extruded from the extrusion head 4 is inserted between the first and second molds 3b, 3c, while the second mold 3c is opened. The second mold 3c is most opened between the positions P4 and P1, and then is gradually closed while moving from P1 to P2, so that the parison 8 can be inserted between the first and second molds 3b, 3c at the desired position from the position P42 to the position P2.

2-2. Molding Process

In the molding process, the first and second molds 3b and 3c are used to form the parison 8. The shapes of the first and second cavity members 3b2, 3c2 in the closed state of the second molds 3c have a shape corresponding to the outer shape of the molded article 9, so the molded article 9 can be formed by molding using the first and second molds 3b and 3c. The molding may be blow molding or vacuum molding.

2-3. Ejection Process 2-3-1. Push-Up Movement of Push-Up Part 7A1: Push-Up Part 7A1 Moves from First Position to Second Position In the ejection process, the molded article 9 molded in the first mold 3b is ejected from the first mold 3b. When the second mold 3c reaches the position P41, the controller controls the driving part 7B (the air supply device) and the engaging member 7C goes down. This causes the first engaging part 7C2 of the engaging member 7C to push down the contact part 7A3, thus making the push-up part 7A1 rise. This pushes up the molded article on the first mold 3b, and the molded article 9 is ejected from the first mold 3b.

2-3-2. Return Movement of Push-Up Part 7A1: Push-Up Part 7A1 Moves from Second Position to First Position Also, when the second mold 3c reaches the position P42, the controller controls the driving part 7B (the air supply device) and the engaging member 7C rises. This causes the second engaging part 7C3 of the engaging member 7C to push up the contact part 7A3, thus making the push-up part 7A1 go down. This avoids interference between the next parison and the push-up part 7A1.

3. Other Embodiments

The engaging member 7C and the contact part 7A3 may be connected.

The driving part 7B can employ a system that drives the push-up member 7A by hydraulic pressure or drives the push-up member 7A by a motor.

The push-up member 7A may be provided in the second arrangement part 3bs, and the air supply part 6 may be provided in the first arrangement part 3bt.

The first and second molds 3b and 3c may be configured to open and close by rotating both the first and second molds 3b and 3c.

The first and second molds 3b and 3c may be configured to open and close by approaching and separating one another in parallel.

The camshaft 3h may be directly connected to the molds.

REFERENCE SIGNS LIST

1: rotary molding machine
2: base part
3: mold unit
3a: column
3b: first mold
3b1: first housing part
3bt: first arrangement part
3bs: second arrangement part
3b11: groove portion
3b12: shaft part
3b2: first cavity member
3c: second mold
3c1: second housing part
3c2: second cavity member
3d: hinge part
3e: pinion gear
3f: rack gear
3ft: linear guide
3g: support wall
3g1: slit 3h: camshaft
3h1: cylindrical part
3h2: shaft part
4: extrusion head
5: cam track member
5a: base plate
5b: annular groove
5b1: side surface
5c: cam track
6: air supply part
7: push-up mechanism
7A: push-up member
7A1: push-up part
7A2: shaft support part
7A3: contact part
7B: driving part
7B1: air cylinder
7B2: piston
7C: engaging member
7C1: flame
7C2: first engaging part
7C3: second engaging part
8: parison
9: molded article
10: power mechanism
11: shaft
12: switch mechanism
12A: base part
12B: switch part
12B1: switch
12C: plate member
13: rail
C: revolving axis

The invention claimed is:

1. A rotary molding machine comprising:
first and second molds;
a camshaft; and
a cam track member, wherein the first and second molds and the camshaft are configured to rotate around a revolving axis, the cam track member has a cam track, the camshaft is configured to move along the cam track as the first and second molds and the camshaft rotates, the first and second molds are configured to open and close, opening and closing of the first and second molds is driven by movement of the camshaft, an angle between a first axial direction and a second axial direction is 45 degrees or less, the first axial direction is a longitudinal direction of the camshaft when the first and second molds are closed, the second axial direction is the longitudinal direction of the camshaft when the first and second molds are most opened, and the first and second molds are configured to open and close by transmitting movement of the camshaft to the first and second molds through a gear mechanism that is fixed to a shaft part of the camshaft.

2. The rotary molding machine of claim 1, wherein a distance from the revolving axis to the cam track varies along a circumferential direction.

3. The rotary molding machine of claim 1, wherein the cam track member has a base plate and the cam track is formed of an annular groove or an annular projection provided on the base plate.

4. The rotary molding machine of claim 1, wherein the first and second molds are connected by a hinge part and are configured to open and close by relative rotation around the hinge part.

5. The rotary molding machine of claim 1, wherein the gear mechanism has a mechanism that converts linear movement into rotational movement.

6. The rotary molding machine of claim 1, wherein an angle between the revolving axis and a horizontal plane is 45 degrees or less.

7. The rotary molding machine of claim 1, further comprising:
an extrusion head, wherein the first and second molds are configured to receive a parison extruded from the extrusion head between the first and second molds.

8. The rotary molding machine of claim 1, wherein the revolving axis is disposed parallel to a horizontal plane.

9. A rotary molding machine comprising:
first and second molds;
a push-up member; and
a driving mechanism, wherein the second mold is configured to open and close with respect to the first mold, the push-up member is provided in the first mold and has a push-up part, the push-up part is configured to move from a first position to a second position and is configured to push up and eject a molded article on the first mold by moving from the first position to the second position, the second position is farther away from the first mold than the first position, the driving mechanism has an engaging member and a driving part, the engaging member is engaged with the push-up member when the push-up part is at the first and second positions, the driving part is configured to drive the engaging member to move the push-up part from the first position to the second position, the push-up member has a contact part and a shaft support part, the push-up part is provided in one side of the push-up member, the contact part is provided in another side of the push-up member, the shaft support part is provided between the push-up part and the contact part and is axially supported by the first mold, the driving part is configured to move down the engaging member in a linear direction so that the contact part is pushed down by the movement of the engaging member and the push-up part is moved up along the movement of the contact part, and the molded article is pushed up by the push-up part.

10. The rotary molding machine of claim 9, wherein the driving part has an air cylinder and a piston that is attached to the air cylinder and is connected to the engaging member.

11. The rotary molding machine of claim 9, further comprising:
an air supply part, wherein the air supply part is configured to supply air into a parison, which is formed into the molded article, and the push-up part is arranged to face the air supply part, and a tip part of the push-up part branches into two parts.

12. The rotary molding machine of claim 9, further comprising:
a base part, wherein the base part is configured to rotate around an axis, and the first mold is fixed to the base part.

13. The rotary molding machine of claim 9, further comprising:
an extrusion head, wherein the first and second molds are configured to receive a parison extruded from the extrusion head between the first and second molds.

14. The rotary molding machine of claim 9, wherein the first and second molds are configured to rotate around a revolving axis disposed parallel to a horizontal plane.

* * * * *